| United States Patent [19] | [11] Patent Number: 5,025,054 |
| Yoshida et al. | [45] Date of Patent: Jun. 18, 1991 |

[54] POLISH CONTAINING A SILICONE RUBBER POWDER

[75] Inventors: Keiji Yoshida, Ichihara; Mitsuo Hamada, Kisaratsu, both of Japan

[73] Assignee: Toray Silicone Company, Limited, Tokyo, Japan

[21] Appl. No.: 433,802

[22] Filed: Nov. 9, 1989

[30] Foreign Application Priority Data

Dec. 1, 1988 [JP] Japan .................... 63-304349

[51] Int. Cl.$^5$ .............................. C08K 5/54
[52] U.S. Cl. .................... 524/267; 524/263; 524/277; 524/487; 106/10
[58] Field of Search ............ 524/267, 263, 277, 487; 106/10

[56] References Cited

U.S. PATENT DOCUMENTS 4,354,871 10/1982 Sutton .................... 106/10
4,398,953 8/1983 Van der Linde .................... 106/10
4,963,432 10/1990 Fuggini et al. .................... 524/267

*Primary Examiner*—Melvyn I. Marquis
*Attorney, Agent, or Firm*—Jim L. DeCesare

[57] ABSTRACT

A polish including a film forming wax material and a silicone rubber. The rubber is in the form of particles mixed with the film forming wax, and the silicone rubber particles contain a silicone oil. The particles have an average diameter of from about 0.3 μm to about 30 μm. The polish includes at least one additive selected from the group consisting of organic solvents, a second silicone oil, and surfactants. The film forming wax material is one of carnauba wax, montan wax, candelilla wax, ceresin wax, paraffin waxes, or beeswax. The silicone rubber forming the particles is one of addition reaction curable silicone rubber compositions, condensation reaction curable silicone rubber compositions, organic peroxide curable organopolysiloxane compositions, or high energy curable silicone rubber compositions.

7 Claims, No Drawings

POLISH CONTAINING A SILICONE RUBBER POWDER

BACKGROUND OF THE INVENTION

The invention is directed to a polish. Polishes have been applied to the surfaces of leather goods, furniture, and automotive bodies for surface protection and for enhanced gloss. Film-forming materials such as waxes and silicone oils as gloss-imparting agents are used. However, conventional polishes have poor applicability and wiping properties and the surface gloss is not durable. Polishes containing silicone oils show exuding of the silicone oil from the coating surface forming a silicone oil film around the coated surface and soiling can be a problem. Such problems can be solved by adding certain silicone rubber powders to the film-forming wax materials.

It is an object of the present invention to provide polishes with excellent wipe workability, soil cleaning, resistance to dust adhesion, and gloss retention. The present invention relates to a polish comprising a film-forming material and a silicone rubber powder containing 0.5–80 wt % of silicone oil.

DETAILED DESCRIPTION OF THE INVENTION

Film-forming materials commonly used in polishes can be used in the present invention. Such film-forming materials may be waxes such as carnauba wax, montan wax, candelilla wax, cerisin wax, and paraffins such as solid paraffins, liquid paraffins, and beeswax.

The silicone rubber particles used in the present invention are effective for providing good wipe workability, soil removal, and gloss retention. Such silicone rubber particles have an average diameter of 0.1–1000 $\mu$m, preferably 0.3 $\mu$m to 30 $\mu$m.

Below 0.1 $\mu$m, the effects of the silicone rubber particles are not realized, while above 1000 $\mu$m, a rough finish is obtained. Preferably, the particles should be spherical, and depending on the type of polishes, preferably 0.1–30 wt % is used for cream and emulsion polishes, and 0.1–50% for solid or paste polishes. Below 0.1% the effects of the silicone rubber particles are not realized, while with excessive amounts of silicone rubber particles, applicability becomes poor.

Any silicone oils can be used with the silicone rubber particles, as long as the oils are nonreactive to the gloss-enhancing components and the silicone rubbers. Preferred oils would have a viscosity of 10–1000 cSt at 25° C. for good polishing effects. Such silicone oils can be dimethyl polysiloxanes terminated by trimethylsiloxy groups at both chain ends, dimethyl siloxane-diphenyl siloxane copolymers terminated by trimethylsiloxy groups at both chain ends, dimethyl siloxanes terminated by trimethylsiloxy groups at both chain ends, 3,3,3-trifluoropropyl methyl siloxane-dimethyl siloxane copolymers, and perfluoroalkyl group-containing polysiloxanes.

The silicone oil content in the silicone rubber particles is 0.5–80 wt %, preferably 3.0–50 wt %.

The silicone rubbers constituting such particles may be obtained by curing addition reaction curable silicone rubber compositions comprising organopolysiloxane containing silicon-bonded hydrogen, organopolysiloxane containing silicon-bonded vinyl groups, and a platinum catalyst as the main components; by curing condensation reaction curable silicone rubber compositions comprising organopolysiloxanes containing hydroxy groups at both chain ends, organopolysiloxanes having silicon-bonded hydrogen, and organotin compounds as the main components; curing condensation reaction curable silicone rubber compositions comprising organopolysiloxanes terminated by hydroxy groups at both chain ends, hydrolyzable organosilanes, and organotin compounds or titanic acid esters as the main components; by curing organic peroxide curable organopolysiloxane compositions comprising organopolysiloxanes containing vinyl groups and organic peroxides as the main components; or curing high energy curable silicone rubber compositions by irradiating with UV rays. Preferred are the addition reaction curable silicone rubber compositions and the condensation reaction curable silicone rubber compositions.

The silicone rubber particles used in the present invention can be prepared by many different methods. For example, the silicone rubber compositions may be compounded with the silicone oil, and the silicone rubber compositions containing the silicone oil are poured into water and mixed uniformly by mixing in a colloid mill or homomixer to obtain aqueous dispersions of silicone rubber compositions containing a silicone oil. The resulting aqueous dispersions are dispersed in water at a temperature above 50° C. or sprayed into hot air for curing of the silicone rubber compositions. It is also possible to cure the silicone rubber compositions and mechanically pulverize the cured products.

The polishes of the present invention contain the film-forming materials and silicone oil-containing silicone rubber particles described above, and may also contain other additives commonly used in polishes. Such additives may be organic solvents, water, surfactants, abrasives, dyes, perfumes, leveling agents, and thickeners. These additives may be used singly or as mixtures. Organic solvents are kerosene, naphtha, mineral spirits, and methylchloroform. Silicone oils may be dimethyl polysiloxanes, methyl phenyl polysiloxanes, methyl hydrogen polysiloxanes, amino-modified alkylpolysiloxanes, cyclic dimethyl polysiloxanes, cyclic methylphenyl polysiloxanes, cyclic methylhydrogen polysiloxanes, and epoxy-modified alkyl polysiloxanes. Surfactants are nonionic surfactants such as sorbitan fatty acid esters, glycerin fatty acid esters, decaglycerin fatty acid esters, polyglycerin fatty acid esters, propylene glycol, pentaerythritol fatty acid esters, polyoxyethylene sorbitan fatty acid esters, polyoxyethylene glycerin fatty acid esters, polyethylene glycol fatty acid esters, polyoxyethylene alkyl ethers, polyoxyethylene phytosterol, phytosterol polyoxyethylene polyoxypropylene alkyl ether, polyoxyethylene castor oil, polyoxyethylene alkylamine fatty acid amide, polyoxytetramethylene polyglyceryl alkyl ether, alkyl fatty acid triglyceride, and polyoxyalkylene dimethyl polysiloxane copolymer; anionic surfactants such as alkyl sulfate salts, polyoxyalkyl ether sulfate salts, N-acylamino acid salts, alkyl phosphate salts, polyoxyethylene alkyl ether phosphate salts, and fatty acid salts; cationic surfactants such as alkylammonium salts, and alkylbenzylammonium salts; amphoteric surfactants such as betaine acetate, imidazolium betaine, and lecithin.

The polishes of the present invention can be prepared readily by mixing the above film-forming materials and silicone rubber particles uniformly, if needed, with additives.

The present invention is further explained in the following examples. In the examples, parts are by weight, and Me stands for the methyl group.

REFERENCE EXAMPLE 1

Preparation or Organopolysiloxane Rubber Particles

A mixture was prepared from 100 parts of dimethyl polysiloxane terminated by dimethylvinylsiloxy groups at both ends represented by

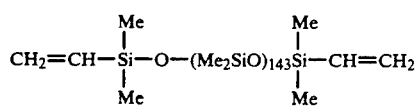

4.7 parts of linear methylhydrogen polysiloxane containing branches represented by $(Me)_{15}(H_7)(SiO)_3$; 50 parts of dimethyl silicone oil having a viscosity of 100 cSt at 25° C., 2.5 parts of polyoxyethylene alkyl ether nonionic surfactant (Tergitol ® TMN-6, a product of Union Carbide Co.), 100 parts of water, and a chloroplatinic acid solution in isopropanol with a platinum content of 100 ppm based on organopolysiloxane. This mixture was poured into a colloid mill to obtain an aqueous dispersion of an organopolysiloxane composition. The dispersion was allowed to flow into a hot water bath at 60° C. to cure the silicone rubber composition to obtain silicone rubber particles. Observation of the silicone rubber particles under a scanning electron microscope showed spherical particles with an average diameter of 7.5 μm. The particles had rubbery elasticity. The dimethyl silicone oil content in 100 g of the silicone rubber particles was 35 g as determined by Soxhlet extraction with.

APPLICATION EXAMPLE 1

In a container equipped with a stirrer was heated and mixed 40 parts of carnauba wax (a product of Nippon Chemical Co.), 40 parts of kerosine, and 10 parts of water at 90° C. After the carnauba wax had melted, 10 parts of the silicone rubber particles in Reference Example 1 were added. The mixture was allowed to cool to room temperature while being stirred to obtain a polish. The polish was applied to the surface of a white-coated iron plate of an acrylic material and exposed outdoors for 14 days. It rained 3 out of the 14 days. Wipe workability, soil cleansing, dust adhesion, and migration of silicone oil to nonpolished areas were evaluated.

The results are set forth in Table I. For comparison, a polish was prepared as above but without the silicone rubber particles (Comparative Example 1) and its characteristics were also measured and are in Table I. For another comparison, a polish was prepared as above using 10 parts of dimethyl silicone oil instead of the silicone rubber particles (Comparative Example 2) and its characteristics were measured and are in Table I.

TABLE I

| EXAMPLE | WIPE WORKABILITY | SOIL CLEANING | DUST ADHESION | SILICONE OIL MIGRATION | GLOSS RETENTION |
| --- | --- | --- | --- | --- | --- |
| Application | Easy | Easy | None | None | Good |
| Comparative 1 | Easy But Uneven | Somewhat Difficult | None | — | Poor No Gloss |
| Comparative 2 | Easy But Uneven | Somewhat Difficult | Substantial | Yes | Poor No Gloss |

That which is claimed is:

1. A polish comprising a film forming wax material and a silicone rubber, the rubber being in the form of particles of an average diameter of 0.1–1000 μm mixed with the film forming wax, the silicone rubber particles containing about 0.5 to about 80.0 percent of a silicone oil based on the weight of the silicone rubber particles.

2. The polish of claim 1 in which the particles have an average diameter of 0.3 μm to 30 μm.

3. The polish of claim 2 in which the particles are spherical.

4. The polish of claim 1 in which the particles constitute about 0.1 to about 50 percent by weight of the polish.

5. The polish of claim 1 in which the silicone oil constitutes about 0.3 to about 50.0 percent by weight based on the weight of the silicone rubber particles.

6. The polish of claim 1 in which the silicone oil has a viscosity of from about ten to about one thousand centistokes measured at twenty-five degrees Centigrade.

7. The polish of claim 1 in which the film forming wax is selected from the group consisting of carnauba wax, montan wax, candelilla wax, ceresin wax, paraffin wax, and beeswax.

* * * * *